Dec. 22, 1959     E. H. FLETCHER     2,917,936
TRACTOR TRANSMISSION-HYDRAULIC POWER SHIFTING
Filed Dec. 9, 1957     4 Sheets-Sheet 1

INVENTOR.
E. H. FLETCHER

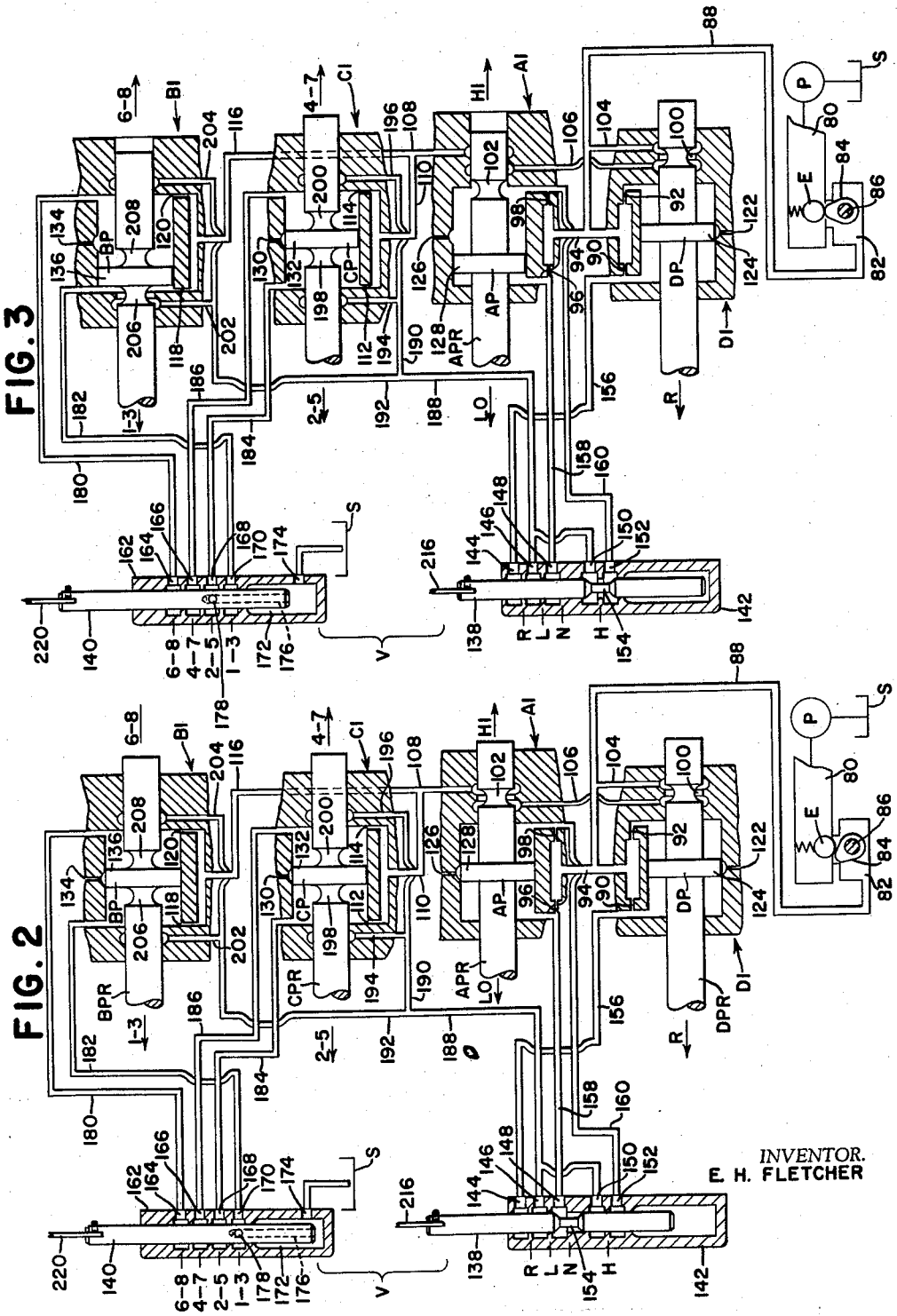

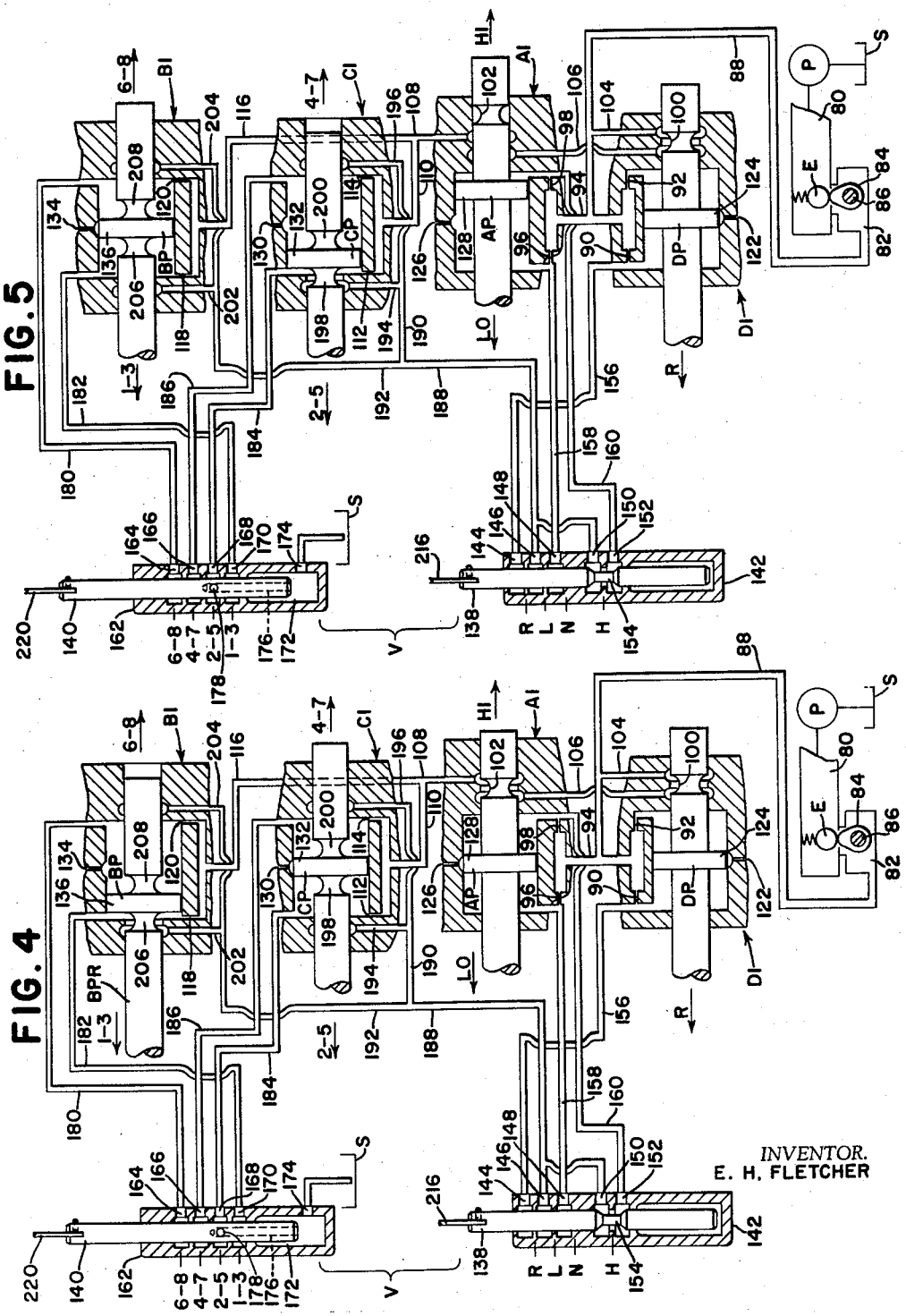

Dec. 22, 1959　　　E. H. FLETCHER　　　2,917,936
TRACTOR TRANSMISSION-HYDRAULIC POWER SHIFTING
Filed Dec. 9, 1957　　　　　　　　　　　　4 Sheets-Sheet 4
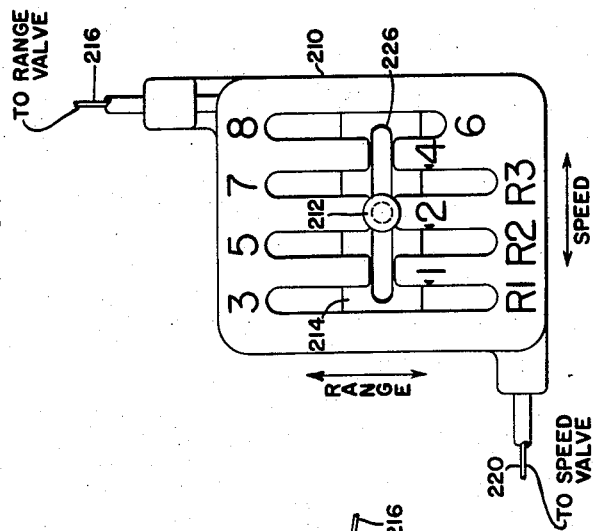
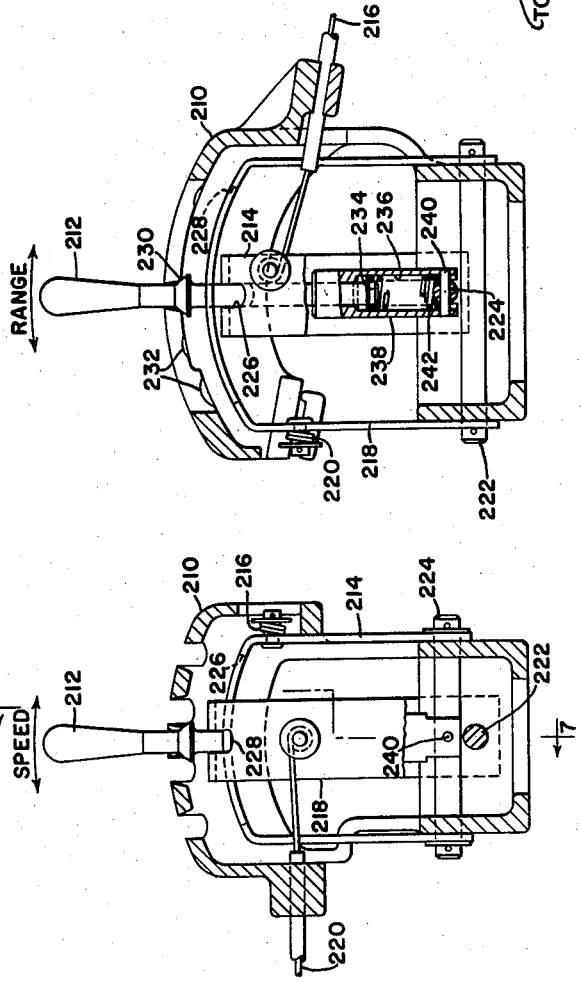
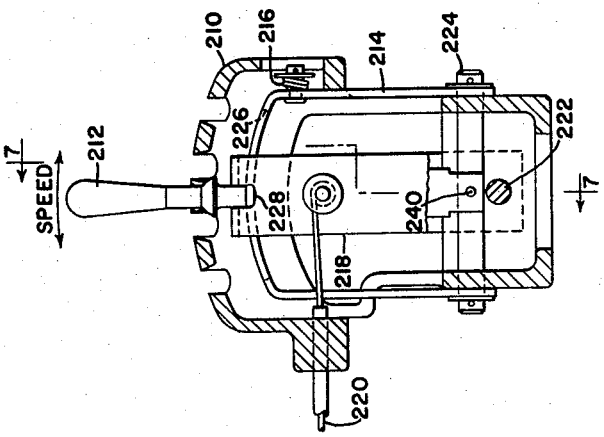
INVENTOR.
E. H. FLETCHER

United States Patent Office 2,917,936
Patented Dec. 22, 1959

2,917,936

TRACTOR TRANSMISSION-HYDRAULIC POWER SHIFTING

Edward H. Fletcher, Waterloo, Iowa, assignor, by mesne assignments, to Deere & Company, a corporation of Delaware Application December 9, 1957, Serial No. 701,491

12 Claims. (Cl. 74—334)

This invention relates to a fluid pressure control system particularly adapted for use in a change-speed transmission of the dual-range and reversible type.

The invention has for a principal object the provision of an improved fluid-pressure control system adapted to coordinate speed and range changes among the several ratios in a transmission having a relatively high number of forward and reverse speeds. In the present preferred embodiment, the control system is applied to a transmission having eight speeds forward and permitting four speeds in reverse. A typical transmission of that character forms the subject matter of the U.S. patent to DuShane 2,710,546. That transmission includes a range section having on its input shaft means for driving a countershaft at either of high or low speeds and means for driving the countershaft at a reverse speed. The countershaft drives a speed section including an output shaft through a plurality of speed-change means enabling the production of four output speeds. Because of the high-low range section, this number of speeds may be doubled to produce the eight forward speeds. The reverse portion of the range section enables the production of four reverse speeds.

The control system embodies a plurality of fluid motors, one each for the reverse drive means and the high-low range means and one for each of two speed-change means. It is a significant feature of the invention that the control system operates on the principle of pressurizing all motors simultaneously with the pistons thereof in selected static positions, with means insuring the retention of those positions until a control valve means is operated to selectively incur operating pressure differentials in selected motors and in such order and combination that a speed ratio is first selected and is then followed by the selection of a range ratio or a reverse ratio. The system further features a coordinated selector valve means operated by a single operating member, means for incurring the proper sequential return of the motor pistons to their neutral positions, means enabling pre-selection of speeds, and such other features and advantages, encompassed by and inherent in the invention, as will appear from the ensuing description and accompanying sheets of drawings, the several figures of which are described immediately below.

Fig. 1 is a sectional view of a typical transmission of the character referred to.

Fig. 2 is a schematic view, partly in section, of the pressure control system, with the motor pistons all in neutral.

Fig. 3 is a similar view in which first speed forward has been accomplished and the control valve has been set to incur fifth speed forward.

Fig. 4 illustrates another step in the shift from first to fifth speed forward.

Fig. 5 shows the final step in the shift from first to fifth speed forward.

Fig. 6 is a sectional view of one form of actuator for the control valve means.

Fig. 7 is a sectional view as seen generally along the line 7—7 on Fig. 6.

Fig. 8 is a plan of the actuator means.

Figure 1:
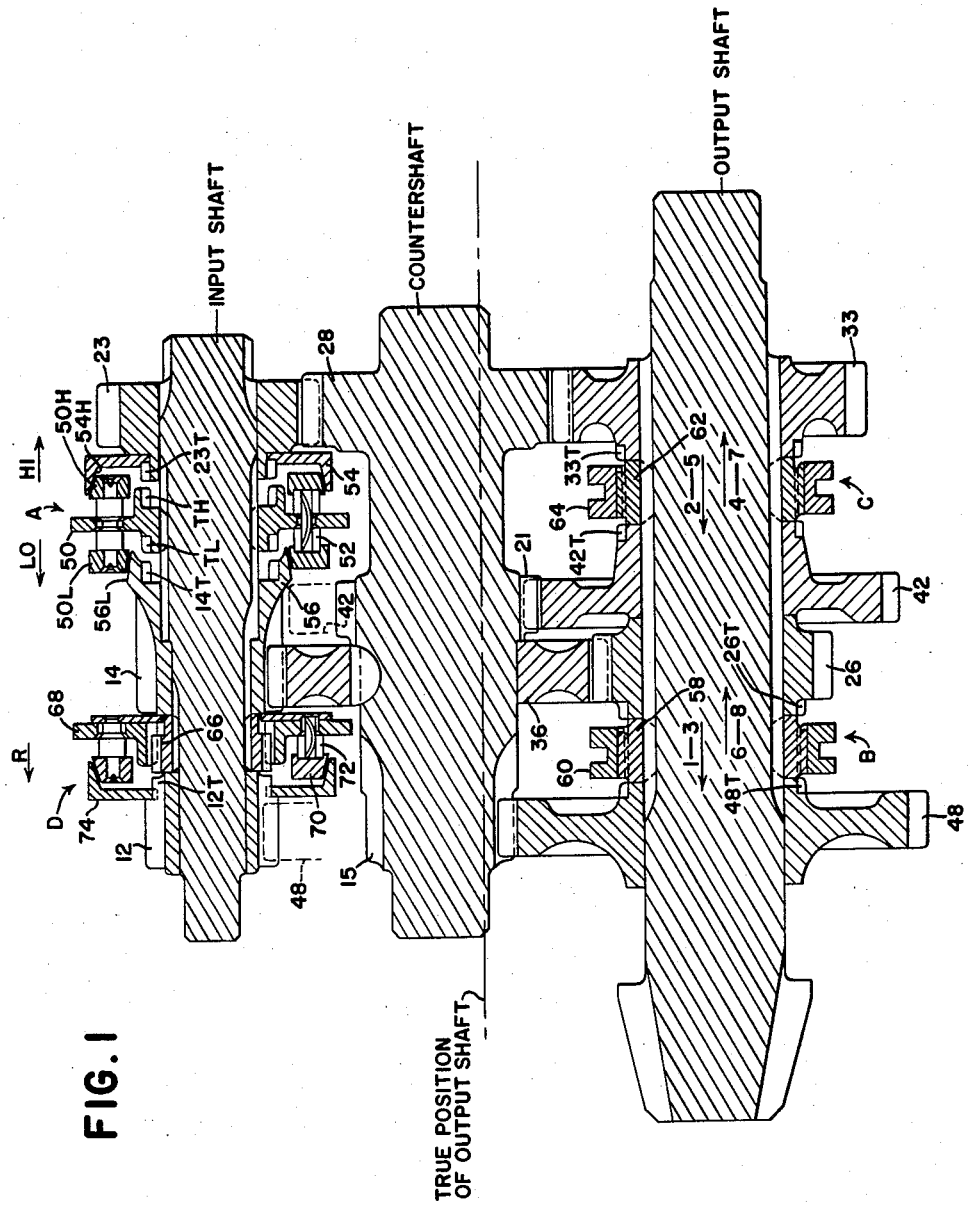

Reference will be had first to Fig. 1, which shows a typical transmission having the speed and range characteristics already referred to. Fig. 1 is based primarily on the disclosure of the above-identified DuShane patent and the same reference characters are employed. As is typical of transmission illustrations, the output shaft is shown slightly displaced from its true position, but that position is illustrated schematically so that the drawing will not be misunderstood. Another thing that should be noted about the drawing is that the numerals applied to the gears correspond to the number of teeth in the respective gears, by means of which it will be relatively easy to compute the exact speed and range ratios. However, on this score, it should be noted that the illustration is for convenience only and is not intended to operate as a limitation of the applicability of the invention to other transmissions.

The input shaft, countershaft, and output shaft are identified and need not be numbered. The input shaft occupies what may be termed the range section of the transmission and has range-drive or forward-drive means A, capable of producing high-and-low range ratios in a forward direction. The range section further includes reverse drive means D. The input shaft has journaled thereon a reverse pinion 12, a low range pinion 14 and a high range pinion 23. The low range pinion 14 and the high range pinion 23 are in constant mesh respectively with countershaft gears 36 and 28, from which it will be seen that when the input shaft is connected with the pinion 14, the countershaft will be driven at a relatively low-range ratio. Conversely, when the input shaft is connected to the high-range pinion 23, the range ratio will produce a higher countershaft speed.

The range drive means A comprises a synchronizer having a shiftable ring 50 which, by means of appropriate detents 52, carries a low speed clutch ring 50L and a high speed clutch ring 50H. The high speed pinion 23 carries at one side thereof a ring 54 which affords an inner friction face 54H selectively cooperative with the synchronizer ring 50H. The low speed pinion 14 has a coaxial extension or hub 56 which affords an outer friction face 56L for selective cooperation with the synchronizer low speed clutch ring 50L. The hub of the high speed pinion 23, which faces toward the synchronizer, has clutch teeth 23T which are engageable with and disengageable from clutch teeth TH on the proximate side of the synchronizer ring 50. Clutch teeth TL on the opposite side of the synchronizer ring are engageable with and disengageable from clutch teeth 14T on the hub of the low speed pinion 14.

From the description above, it will be seen that when the clutch ring 50 is shifted to the right or in the direction indicated by the legend "HI," the synchronizer or clutch rings 50H and 54H will first engage to synchronize the speeds of the two members and that thereafter the detent means 52 will yield so that the clutch teeth TH engage the clutch teeth 23T to establish a positive drive between the input shaft and the pinion 23, whereby the countershaft is driven in the high-range ratio. Shifting of the clutch ring 50 in the opposite direction, as indicated by the arrow "LO" will effect synchronization between the input shaft and low speed pinion 14 via the synchronizer rings 50L and 56L, followed by positive engagement of the teeth TL with the pinion teeth 14T, establishing a positive drive from the input shaft to the pinion 14 for driving the countershaft in its low-range ratio.

The countershaft has keyed or otherwise fixed thereto, in addition to the countershaft gears 28 and 36 already described, a small countershaft gear 15 and a second somewhat larger gear 21. The output shaft journals four gears of progressively increasing size; viz., 26, 33, 42 and 48. As will be seen, these gears in the order named are in constant mesh with the countershaft gears 36, 28, 21 and 15. The output shaft and its relation to the countershaft establishes the speed section of the transmission and speed changes are effected by a pair of speed change means B and C. The means B comprises a shiftable ring 60 splined to a hub 58 which is in turn splined to the output shaft. The ring 60 is shown in its neutral position. When shifted to the left, it positively couples the hub 58 to the teeth 48T on the gear 48, thus connecting the gear 48 to the output shaft and the output shaft is rotated from the countershaft according to the range ratio established by the range means A. When the ring 60 is shifted to the right, it couples the output shaft to the gear 26 via gear clutch teeth 26T.

The speed change means C is similar to that described at B and comprises a hub 62 keyed to the output shaft and having axially shiftably splined thereto a shifting ring 64 which is shiftable to the left to positively connect the output shaft and the gear 42 via gear clutch teeth 42T. When the ring 64 is shifted to the right, a positive coupling between the output shaft and the gear 33 is effected by gear clutch teeth 33T.

Since the countershaft can be driven at either of two range speeds according to the position of the ring 50 in the range drive means A, each of the gear sets 15—48, 36—26, 21—42 and 28—33 will produce two forward speeds. These are indicated as to nature and as to the direction of shifting of the respective rings 60 and 64 by appropriate legends in Fig. 1. For example, when the clutch ring 60 is shifted to the left, it will produce either first or third speed forward, depending upon whether low or high range ratio is produced at A. The other legends are believed to be self-explanatory.

The range drive means D comprises a synchronizer substantially one-half of that previously described at A. To this extent, the reverse synchronizer comprises a shiftable ring 68 axially shiftably splined to a hub 66 that is in turn splined to the input shaft. A synchronizing ring 70 is carried by the ring 68 via appropriate detent means 72 for cooperation with a friction clutch ring 74 that is keyed to the reverse pinion 12. When the ring 68 is shifted to the left or in the direction "R," synchronizing is first achieved at 70—74 and then a positive coupling is effected with gear clutch teeth 12T on the pinion 12. As will be brought out below, the drive means A and D cannot be effective at the same time. Hence, the drive means A will produce neutral and either of two range ratios in the countershaft and the reverse drive means D will produce either neutral or reverse rotation of the countershaft.

As already described, the drawing illustrates the output shaft out of its true position. In its true position, however, the output shaft is so arranged that the gear 48 is in constant mesh with the reverse pinion 12. Since the gear 48 is also in constant mesh with the countershaft pinion 15, the countershaft will rotate in a reverse direction whenever the means D is engaged. When the clutch ring 60 of the speed change means B is shifted to the left, the output shaft will be connected to the reversely rotating gear 48 and will produce one speed in reverse. When the clutch ring 60 is shifted to the right, it will positively couple the output shaft to the gear 26 which, being in constant mesh with the reversely rotating countershaft gear 36, will produce another speed in reverse. The same is true for obtaining two other reverse speeds by shifting of the clutch ring 64 in the speed change means C. For purposes for which the specific transmission was developed, the reverse speed produced by shifting of the clutch ring 64 to the right is too high for safety and normally the controls will be arranged so that this reverse speed cannot be used. Nevertheless, it is available if it is desired to use it.

For purposes of brief reference, the eight forward speeds and the four possible reverse speeds are summarized in tabular form below.

| Gear | Power Train | Range |
|------|-------------|-------|
| 1 | 14:36–15:48 | Low. |
| 2 | 14:36–21:42 | Low. |
| 3 | 23:28–15:48 | High. |
| 4 | 14:36–28:33 | Low. |
| 5 | 23:28–21:42 | High. |
| 6 | 14:36–36:26 | Low. |
| 7 | 23:28–28:33 | High. |
| 8 | 23:28–36:26 | High. |
| 1R | 12:48 | Reverse. |
| 2R | 12:48–15:21:42 | Reverse. |
| 3R | 12:48–15:28:33 | Reverse. |
| (4R) | (12:48–15:36:26) | (Reverse.) |

The application of the improved fluid-pressure control system follows the basis of providing fluid motors A1, B1, C1 and D1 respectively for the drive means A, B, C and D. Described otherwise, the motors A1 and D1 are for the range section and the motors B1 and C1 are for the speed section. More specifically, the motor A1 is a range motor, the motor D1 is a reverse motor, and each of the motors B1 and C1 is a speed motor. Each of these motors is of the two-way type and they respectively have pistons AP, BP, CP and DP mounted on piston rods APR, BPR, CPR and DPR. The piston rod APR is mechanically connected in any suitable manner, not important here, to the shifter ring 50 of the drive means A. Similar mechanical connections, likewise of no material importance here, are effected from the piston rods, CPR, BPR and DPR to the respective rings 60, 64 and 68 of the drive means B, C and D, respectively. Any suitable connections may be used, so long as shifting of a piston effects shifting of the clutch ring to which it is connected, and so long as the mechanical connection synchronizes the positions of the pistons with the neutral and active positions of the respective shift rings. When the piston AP of the motor A1 is in neutral, the ring 50 of the drive means A should be in neutral. As respects the reverse drive means D, which has a neutral position and only one active position as distinguished from the two active positions of the means A, B and C, the piston DP when in neutral, corresponds to the neutral position of the reverse shifter ring 68 and the position of the piston DP, when moved to the left as seen in Figs. 2–5, corresponds to the engaged status of the means D.

The pressure system includes a pressure source, such as a pump P, and a reservoir or sump S. The system shown here is of the constant-pressure type having a variable displacement pump; although, any other arrangement may be used. The pump delivers initially to a pressure chamber 80 which is connectible to and disconnectible from a discharge chamber 82 by a valve E, here shown schematically as a spring-loaded ball. The status of the valve E is changed according to an actuator, here in the form of a cam 84 mounted on a shaft 86. In the application of the arrangement to a vehicle, the shaft 86 may be the clutch operating shaft and is arranged so that when the clutch pedal (not shown) is depressed to disengage the engine clutch, (not shown) the ball E is opened against its spring to admit pressure to the discharge member 82.

The pressure discharge chamber 82 exits to a first pressure line 88 which has a pair of restricted branches or orifices 90 and 92 leading to opposite ends of the motor D1, respectively at opposite sides of the piston DP. The line 88 has a portion 94 provided with a pair of restricted branches or orifices 96 and 98 leading to the motor A1 respectively at opposite sides of the motor piston AP.

A second pressure line is connected to the pressure line 88 upstream of the restricted branches 90, 92, 96 and 98. This second pressure line is made up of several portions controlled by interlock valve means 100 and 102, here formed respectively on the piston rods DPR and APR and operating in housing portions of the respective motors D and A. The second line portions that lead from the pressure line 88 comprises a portion 104 leading to the interlock valve 100, a portion 106 leading from the interlock valve 100 to the interlock valve 102 and a portion 108 leading in parallel to the speed motors B1 and C1, splitting off at 110 to a pair of restricted branches or orifices 112 and 114 to the motor C1 respectively at opposite sides of the motor piston CP, and at 116 to a pair of restricted branches or orifices 118 and 120 that lead to the speed motor B1 respectively at opposite sides of that motor piston BP. When both pistons AP and DP are in their respective neutral positions, the interlock valves 100 and 102 are open so that the pressure lines 88 and 104—106—108—110—116 communicate simultaneously with the respective motors A1, B1, C1 and D1 so that, when the valve E is opened by the actuator 84, all motors are pressurized simultaneously. As illustrated, the motors are identical as to size and construction and the piston areas are equal at opposite sides of each piston. Thus, if there is no exit from the motor chambers, or if the exit is regulated to balance the flow from opposite sides of the respective pistons, the pressurization will be equal or will balance across the pistons so that the pistons retain their respective static positions.

The neutral positions of the pistons are achieved by a plurality of neutralizing valve means, one for each piston. For example, the motor D1 has its neutralizing valve means disposed midway between the ends of the motor and comprising an orifice 122 and a valve element 124, here an integral portion of the piston DP, which operates, when the piston DP is in its neutral position, to negative the orifice 122, which may be accomplished by having the valve element 124 blocking the orifice 122 completely or by positioning of the valve element 124 so that flow from opposite sides of the piston DP is equal. In a preferred embodiment, the orifices 90, 92 and 122 are of the same size, although these sizes may be varied to accomplish the desired pressure drop and speed of operation, as will be clarified below.

The same relationship among orifices as to size, etc., exists as among the inlet orifices or restricted branches 96 and 98 in the motor A1 and an orifice 126 of the neutralizing valve means for that motor. Here again, the cooperating neutralizing valve element for controlling the orifice comprises a portion 128 on the piston AP. An orifice 130 and a cooperating piston portion 132 for the motor C1 and an orifice 134 and a cooperating piston portion 136 for the motor B1 establish the neutralizing valves for those motors. Since the orifices 122, 126, 130 and 134 lead to reservoir they may be considered as motor-to-reservoir orifices.

Control of the motors A1, B1, C1 and D1, as respects the incurring of the necessary pressure differentials therein to effect shifting of the respective pistons, is effected by a main valve V, hereinafter referred to sometimes as the control valve means or the selector valve means, and this valve selectively establishes communications among several lines involving also subsidiary valve means operative in response to the attainment by certain of the pistons of certain of their positions. The valve means V is made up of a pair of valves; namely, a range valve 138 and a speed valve 140. The range valve 138 is carried in a bored housing or cylinder 142 which has a plurality of axially spaced valve ports 144, 146, 148, 150 and 152. The valve 138 has therein an annular groove 154, which is operative selectively to establish communication between adjacent pairs of the ports just described. The paired ports are labeled R, L, N and H, representing respectively reverse, low, neutral and high in the range section. When the valve member 138 is shifted axially so that the groove 154 connects a certain pair of neighboring ports, the groove will line up with one of the position-indicating letters just referred to. For example, in Fig. 2, the groove 154 is opposite the "N" position; therefore, the valve 138 is in its neutral position. In Fig. 3, the groove 154 is opposite the "H" position, which means that the valve 138 is in its high position. The same is true of the position of the valve 138 in Figs. 4 and 5.

The valve port 144 is permanently connected via a reverse exhaust line 156 to the reverse motor D1 at the active-position side of the reverse motor piston DP. The exhaust line is larger than the orifice 90 and is downstream of this orifice. For present purposes, and omitting the details of operation, it will be seen that if pressure is applied via the line 88 and branches 90 and 92 to opposite sides of the motor D1, the pressure drop across the restrictions or orifices 90 and 92 will be the same and if the exhaust line 156 is blocked from reservoir, the pressure will balance at opposite sides of the piston DP and the neutral position of that piston will be retained. However, if the exhaust line 156 is opened to reservoir, a pressure drop will occur at the left-hand or active-position side of the piston DP and the pressure differential will then cause the piston to shift to the left or to its reverse position which will engage the reverse drive means D of Fig. 1. As the piston DP moves to its active or reverse position, the piston portion 124 uncovers the exit or motor-to-reservoir orifice 122 and if the exhaust line 156 is again blocked, the pressure will drop at the right hand side of the actively positioned DP and the piston will be returned to neutral, at which point it will again negative the orifice 122. The occurrence of the pressure drop will be readily understood by noting that the uncovered orifice 122 in the active position of the piston DP accommodates motor flow, whereas there is no escape for flow at the left hand side of the piston. Therefore, the pressure at the left hand side of the piston will exceed that at the right hand side and consequently the neutral position will be achieved. Of course, as the piston portion 124 negatives the orifice 122 in the neutral position of the piston, the pressure at opposite sides of the piston will then regain its balance and the neutral position will be secured. At this point, as well as in connection with the other pistons, it should be noted that the mechanical limits of shiftability of the various clutch rings 68, 50, 60 and 64 is such that no piston will ever move far enough to cover its exhaust line connection.

The foregoing is a brief and fundamental description of one phase of operation and is not intended to supply all details. Elaboration will be indulged below.

The valve ports 148 and 152 are permanently connected by range exhaust lines 158 and 160, respectively, to the range motor A1 respectively at opposite sides of the range motor piston AP and respectively downstream of the restricted branches 96 and 98. As shown in Fig. 1, these exhaust lines 158 and 160, like the exhaust line 156 from the reverse motor D1, are blocked in the neutral position of the valve 138, and consequently there is no flow from the motors D1 and A1 to reservoir with the result that pressures balance at opposite sides of these motor pistons and these pistons remain in their neutral positions. Fundamentally, the system of operation described in connection with the reverse motor D1 applies to the range motor A1, except that the latter operates in opposite directions respectively at opposite sides of neutral to either of two active positions, which is required because this motor produces, in addition to neutral, the low and high range positions of the range shift means A. As will be seen, selection is made between the two motors A1 and D1, according to whether the transmission is to operate in forward or in reverse. In forward operation, two ranges are available. In reverse, operation, only one range is available on the basis of the present disclosure;

although, variations will immediately suggest themselves.

The speed valve 140 is carried in an appropriate bore in a speed valve housing 162 which has a plurality of axially spaced apart ports 164, 166, 168 and 170. In addition, the lower end of the housing 162 affords a chamber 172 which communicates via a port 174 with the reservoir or sump S. The valve 140 is axially drilled at 176 and a radial port 178 in the valve communicates with the axial bore to connect the chamber 172 with any one of the ports 164, 166, 168 and 170, thereby selectively connecting these ports to the reservoir or exhaust port 174.

The ports 164 and 170 are permanently connected by speed motor exhaust lines 180 and 182, respectively, with the speed motor B1 respectively at opposite sides of the speed motor piston BP and respectively downstream of the speed motor restricted branches 118 and 120. The occurrence of a pressure differential in the motor B1 at one side or the other of the piston BP depends upon connecting one or the other of the exhaust lines 180 and 182 to the reservoir port 174 via the valve 140, the details of which will be elaborated below. The valve ports 166 and 168 are connected by speed motor exhaust lines 184 and 186, respectively, to the speed motor C1 respectively at opposite sides of the speed motor piston CP and respectively downstream of the speed motor restricted branches 112 and 114. Here, as in the case of the exhaust lines previously described, the exhaust lines are larger than the orifices in their respective motors. The grooves for the ports 164, 166, 168 and 170 are appropriately labeled to show the speed possibilities obtainable according to the positions of the valve; viz., 6—8, 4—7, 2—5 and 1—3. The valve in Fig. 2 is in the 1—3 position for selecting either first or third, the ultimate selection of which will depend upon the phase of operation of the range valve 138 as among reverse, low or high. In Figs. 3–5, the speed valve 140 has been shifted so that the radial port 178 is in register with the 2—5 groove and thus with the ports 168, indicating that the speed to be ultimately selected is either second or fifth, depending upon the phase of operation of the range valve 138.

Proper coordination of the system, particularly with respect to the sequence in which the pistons are moved, depends upon sequence means, here pre-selected by the valve means V and completed by one or the other of the speed motors. The preferred embodiment employes a sequence line 188 connected by branches as shown to the ports 146 and 150 of the range valve 138 and branching at 190 and 192 to the motors C1 and B1 respectively. The branch 190 is itself branched at 194 and 196 and these branches are respectively controlled by sequence valves 198 and 200 on the piston rod CPR of the piston CP for the speed motor C1. The other sequence line branch 192 is branched at 202 and 204 and is controlled by sequence valves 206 and 208 respectively on the piston rod BPR of the piston for the speed motor B1. The above described sequence arrangement is only representative of many that could be employed. The important thing is that the sequence line is first connected to a range motor D1 or A1 and is ultimately connectible to reservoir, but the final connection is made dependent upon attainment by one or the other of the speed motor pistons of one or the other of its active positions. When the respective speed motor piston is in its neutral position, the sequence valves are closed and the sequence line cannot communicate with the reservoir. In the particular example shown, and considering only that portion of the sequence line shown at 188—190—194, the branch 194 is blocked by the piston rod portion in the neutral position of the piston CP. It will be seen, however, that when the piston CP shifts to the left to its active position, as in Fig. 5, the sequence valve 198 establishes communication between the branch 194 and the interior of the motor. Since the motor interior is already connected to the line 184, and since the speed valve 140 had been previously moved upwardly to the 2—5 position so that the port 178 registers with the 2—5 groove, line 184 is connected to the reservoir port via the valve member axial bore 176 and completes the sequence line to the reservoir. In other words, the system involves pre-selection but post-ponement of the connection of one part or the other of the sequence line to reservoir, and completion of that status is achieved when the selected speed motor piston attains its active position.

Control of the system is effected by operating the valves 138 and 140 in unison but to different positions according to the speed ratio, range ratio and direction desired. One form of control for the valve V is shown in Figs. 6, 7 and 8 as comprising a supporting housing 210 slotted to afford a shift pattern as best shown in Fig. 8, wherein appropriate legends indicate the several speeds and direction positions of a shift lever 212. The lever 212 is operative from left to right (as seen in Fig. 8) to actuate the speed valve 140 and is operative fore-and-aft as seen in the same figure to operate the range valve 138. For this purpose, the lever 212 is connected to a fore-and-aft rockable range-change yoke 214 which is connected to one end of a range valve operating cable 216, the other end of which is connected to the range valve 138. The lever 212 also has a connection with a laterally rockable speed-change yoke 218 to which is connected one end of a speed valve operating cable 220, the other end of which is connected to the speed valve 140. The yoke 218 is rockable laterally about a fore-and-aft pin or shaft 22 and the range yoke 214 is rockable fore-and-aft about a transverse pin or shaft 225. The range yoke 214 is slotted at 226 to accommodate the lever when it is moving laterally, and the speed yoke 218 is slotted at 228 to accommodate the lever 212 when it is moving fore-and-aft. The lever is releasably detented in its several positions by means of a releasable locking element 230 engageable selectively with any one of a plurality of notches as at 232, according to the position of the lever. The spring-loading of the detent 230—232—234 is accomplished by an extension 234 of the lever which is received in a bore 236 in a barrel 238 mounted on the cross pin 224 by a smaller pin 240 that parallels the fore-and-aft pivot shaft 222. Thus, the operator may press down on the lever 212 to disengage the portion 230 from whichever notch 232 it is in, so that the change in position may be more easily effected. When he releases the lever after the position has been achieved, the means 230—232 retains the position. As will be seen, the spring load is accomplished by a compression spring 242 which acts against the pin 224 and the pin 240 and at its other end abuts the extended end 234 of the lever 212.

The shift pattern as shown in Fig. 8 is consistent with the requirement that the speed is selected first and then the range or direction is selected. For example, the lever 212 in Fig. 8 is in a neutral phase as to range and is in a position intermediate the fore-and-aft 2—5 and 4—7 slots so that the speed valve 140 is positioned with its radial bore 178 midway between the 2—5 port 168 and the 4—7 port 166. The lever may be shifted immediately to the left of that position to select the 2—5 status, at which time it will have operated the speed-valve 140 to the 2—5 position to register the ports 178 and 168. Whether the transmission operates in high, low or reverse depends upon the fore-and-aft change in the lever 212 after it reaches the 2—5 slot in the housing 210. For example, if the lever is moved forwardly to the No. 5 position, the already achieved position of the speed valve 140 will be retained, but the range valve 138 will be moved to its high position. This will produce fifth speed forward via the valve arrangement shown in Figs. 3, 4 and 5.

In the same manner, reverse may be obtained by moving the lever 212 first to one of the fore-and-aft slots and then all the way rearwardly to the reverse position thereof. If the lever is moved only part way in a rearward direction, one of the low-range speed ratios will be selected; namely, first, second, fourth or sixth. As respects the 6—8 slot, it should be noted that the slot is shorter than the others in a rearward direction so that only sixth speed forward can be obtained but the fourth speed in reverse cannot be obtained. For reasons already indicated, the availability of the fourth speed in reverse is recognized but is not exploited.

OPERATION

For purposes of convenience, the high-low motor A1 and the reverse motor D1 will be referred to sometimes as range-section motors. The motors B1 and C1 have already been designated speed motors. A basic understanding of the underlying principles of operation will be readily achieved by recognizing that the system depends upon the creation of pressure drops sequentially in first a motor from the speed section and next a motor from the range section, and this sequential pressure drop in each instance is incurred by exhausting selected sides of selected motors to reservoir. The basic exhaust media are the exhaust port 174 in the speed valve 140 and the interconnected sequence ports 146 and 150 in the range valve 138 which lead to the sequence line 188. The specific identity of the two ports 146 and 150 will be ignored and reference will be had primarily to the sequence line 188. Stated briefly, a speed-range change will occur in the transmission by connecting one end of a speed motor to the reservoir port 174 and one end of a range motor to the sequence line 188, accompanied of course by opening the valve E. The relationship of the valve positions to the connections of exhaust lines to the reservoir port 174, control of the sequence line 188 by the sequence valves and the speeds and directions obtained appear in tabular form below.

*Line and valve connections*

| Gear | Speed Valve | Range Valve | Sequence Valve |
|---|---|---|---|
| 1 | 182-170-174 | 158-148-188 | 206 |
| 2 | 184-168-174 | 158-148-188 | 198 |
| 3 | 182-170-174 | 160-152-188 | 206 |
| 4 | 186-166-174 | 158-148-188 | 200 |
| 5 | 184-168-174 | 160-152-188 | 198 |
| 6 | 180-164-174 | 158-148-188 | 208 |
| 7 | 186-166-174 | 160-152-188 | 200 |
| 8 | 180-164-174 | 160-152-188 | 208 |
| 1R | 182-170-174 | 156-144-188 | 206 |
| 2R | 184-168-174 | 156-144-188 | 198 |
| 3R | 186-166-174 | 156-144-188 | 200 |
| (4R) | 180-164-174 | 156-144-188 | 208 |

When the transmission is in neutral (Fig. 2), the clutch pedal shaft (or its equivalent) is in a position corresponding to engagement of the engine clutch (not shown), so that the cam 84 occupies the position shown, whereby the valve E will be closed. The range valve 138 is in the neutral position as shown and the position of the speed valve 140 is immaterial. The speed valve is shown in its 1-3 position as a prelude to the Fig. 3 condition, but since the valve E is shown closed, neither of the speed motors can shift. Of course, since the range valve 138 is in neutral, neither motor in the range section can shift. Figs. 6, 7 and 8 show the actuator lever 212 in the transverse slot intermediate the 4—7 and 2—5 slots, which is merely an illustrative position to achieve a condition in which all pistons are in neutral and further because it enables Figs. 6 and 7 to be drawn normal to each other. To correspond with the position of the speed valve 140 in Fig. 2, the lever 212 should be in the 1—3 slot. For present purposes, it can be assumed that the lever is so positioned, which will achieve the position of the speed valve 140 as shown in Fig. 2. With the speed valve thus positioned, the operator is given a choice as to whether to proceed in first or third speeds forward or first speed in reverse. Accordingly, he must make a range selection by moving the lever 212 either fore or aft to incur the selected position of the range valve 138.

Let it be assumed that the operator desires to travel in first speed forward. Thus, after selecting the 1—3 slot in the actuator housing or pattern 210, he will then move the lever rearwardly until it registers with the arrowhead next to the numeral 1 in Fig. 8. This will shift the range valve 138 from neutral to low, in which case the groove 154 will then connect the ports 146 and 148 in the range valve housing. This means that the low or left side of the range motor A1 is connected to the sequence line 188 via the exhaust line 158 and the ports just mentioned. Up to this point, no change is effected, since the piston of the 1—3 speed motor B1 is still in neutral and the sequence line branches 202 and 204 are blocked by the associated portions of the piston rod BPR. In this selection of speed and range ratios, the motors C1 and D1 are idle and their pistons are in neutral. As indicated, the position of the speed valve 140 as shown in Fig. 2 connnects the port 170 with the reservoir port 174 via the radial passage 178 and the axial passage 176. This in effect connects the 1—3 exhaust line 182 to reservoir, thus setting up a condition in which the left hand side of the motor B1 is connected to the reservoir.

With the above setting, the operator now depresses the clutch pedal, or its equivalent, causing the cam 84 to unseat the valve E and admitting pump pressure from the chamber 80 to the chamber 82 and thus to the pressure lines 88 and 104, the latter being established by the interlock valves 100 and 102, since the pistons DP and AP are in neutral. The exhaust line 156 from the reverse motor D1 is blocked by the range valve 138 and nothing happens to the reverse motor. Likewise, the exhaust lines 184 and 186 from the 2—5, 4—7 speed motor C1 are blocked at the valve 140 and nothing changes the neutral status of this motor. Pressure from the pressure line thus flows through the restricted branches 96 and 98 to opposite sides of the high-low motor piston AP but the neutral status of this piston is retained, since the exhaust line 158, even though connected to the sequence line 188 via the ports 148 and 146 and groove 154, cannot carry fluid, since the sequence line is blocked at 202 and 204 by the piston rod BPR (sequence valves 206 and 208 are closed). Likewise, the sequence line is blocked at 194 and 196 because of the neutral status of the piston CP in the speed motor C1 (sequence valves 198 and 200 are closed). Since the range motor piston AP is in neutral, the interlock valve means 102 is open, as is the interlock valve means 100 for the reverse motor D1. Therefore, pressure is transmitted by the line portions 104—106—108—116, and from the latter via the restricted branches 118 and 120 to opposite sides of the piston BP in the 1—3, 6—8 speed motor B1. Since the left hand side of this motor is now connected by the exhaust line 182 to the reservoir 174 via the speed valve 140, a pressure differential occurs in the motor B1 in favor of moving the piston BP to the left. That is to say, the pressure drops at the left hand side of the piston, since there is no escape for fluid at the right side of the piston, but the fluid at the left side can escape via the exhaust line 182 to the reservoir port 174. Therefore, the piston BP moves to the left to its active position and by means of the previously referred to mechanical connection to the ring 60 shifts the ring to the left (Fig. 1) to couple the output shaft to the output shaft gear 48 at the clutch teeth 48T.

When the piston BP attains its active position as just indicated, the sequence valve 206 opens the sequence line branch 202 and communicates that line to the interior of the motor B1 at the left side of the piston BP, thus connecting the sequence line to the reservoir via the already connected exhaust line 182. This drops the pressure at the left hand side of the range motor piston AP and that piston will move to the left, operating through its mechanical connection to the ring 50 to actuate the synchronizer to establish low range in the countershaft by shifting the clutch A to "LO." Thus, the power train is completed from the input shaft to the output shaft via the countershaft in low range and establishing first speed forward because of the ratio between the countershaft pinion 15 and the output shaft gear 48, the countershaft range ratio being determined by the constant mesh between the low speed input shaft pinion 14 and the countershaft gear 36.

One thing that should be noted in the operation just described is that the pistons are shifted at what may be termed orifice pressure rather than line pressure, which results from the pressure drop caused by the orifices 98 and 120, which are the effective orifices in the speed and range changes just referred to. Another feature of significance is that although the range valve selects a connection to the sequence line 188, the connection of the sequence line to the reservoir is not completed until the speed attains its active position. In other words, the arrangement pre-selects the range change but postpones that change until the speed change has been completed. Stated briefly, the arrangement requires initial selection of a speed ratio and subsequent selection of a range ratio in that order. This has value from many standpoints, principal among which is the consequent ease of shifting. For example, the greater mass is involved in shifting the clutches B and C; therefore, it is desired that the countershaft be freed from the input shaft during speed and range changes. For the same reason, the shift sequence enables the use, if desired, of synchronizers in only the clutches A and D rather than throughout; although, it may be desirable for other reasons to replace the clutches B and C with synchronizers of the type shown at A.

After both pistons BP and AP in the speed motor B1 and range motor A1 move to their active positions as just described, the respective neutralizing valve means 134—136 and 126—128 open and become operative to accommodate motor flow at the right hand sides of the respective pistons. As already described, the orifices 134 and 126 lead to reservoir. Of course, after the range and speed ratios are selected and the gears or clutches are engaged, the operator will release the clutch pedal so that the engine clutch engages, permitting the valve E to close and thus to relieve the pressure in the system downstream of the valve E.

Return of the transmission to neutral is effected as follows. The selector lever 212 is moved to the transverse neutral slot, for example to the position of Fig. 8, which results in returning the range valve to its Fig. 2 position so that both range motor exhaust lines 158 and 160 are again blocked. As a further incident to shift of the range motor piston AP to its active position to the left, the interlock valve 102 blocks communication between the second pressure line passage portions 106 and 108. Thus, pressure is not available for the speed motor B1 until the range piston AP returns to neutral. Consequently, pressure rise is confined to the line portions 88 and 94 and the restricted branches 96 and 98. As already indicated, the exhaust line 158 is now blocked and, since the orifice 126 for the motor A1 is open to reservoir, a pressure drop will occur at the right hand side of the low-positioned motor piston AP with the result that the piston will start to move to the right. As the piston attains its neutral position, the valve element portion 128 thereon closes the orifice 126, so that the pressure at both sides of the piston becomes equal. Since the interlock valve 102 is now open, the second pressure line portions 106 and 108 carry fluid pressure to the motor B1. This flow will be merely to reservoir without effecting a change in the 1—3 position of the piston BP if the lever 212, although in the neutral slot, is allowed to remain still in the 1—3 slot, thus retaining the 1—3 position of the speed valve 140. Thus, the power train in the transmission is interrupted by neutralizing only the clutch A even though the 1—3, 6—8 clutch is engaged in its 1—3 position. However, if the lever 212 is moved to the assumed position of Fig. 8, it lies between the 2—5 and 4—7 slots and thus places the radial port 178 of the speed valve in a blocked position between the 2—5 port 168 and the 4—7 port 166, thus blocking both exhaust lines 180 and 182 (and, incidentally, blocks the exhaust lines 184 and 186 of the 2—5, 4—7 motor C1). Consequently, instead of flowing to reservoir as suggested above, the pressure will rise at the left of piston BP and will shift this piston to the right until the piston valve element 136 cuts out the orifice 134 when the piston reaches neutral, at which time the pressure will equalize at both sides of the piston and will thus retain the neutral status.

Figs. 3, 4 and 5 show what is involved in a shift from first speed forward to fifth speed forward. This example is chosen as an illustration because it involves operation of the three motors A1, B1 and C1. Starting with the assumption that the selector lever 212 is in the 1—3 slot and opposite the numeral 1 (Fig. 8) to produce first speed forward, it is then moved to the transverse neutral slot, which neutralizes the range motor as described just above. The lever is then moved laterally to the 2—5 slot, which to that extent changes the position of the speed valve 140 to its 2—5 position (Fig. 3), following which the selector is moved forwardly to the No. 5 position, which changes the range valve to its high position (also Fig. 3). The clutch pedal is depressed so as to rock the shaft 86, which causes the cam 84 to unseat the initial valve E, whereupon the lines 88 and 104—106—108—110—116 become pressurized to all motors A1, B1 and C1.

Fig. 3 shows the status of each motor when the transmission is in first speed forward and just after the selector lever has been moved to the No. 5 position. The piston BP of the motor B1 is still in its 1—3 position and the piston AP of the range motor A1 is still in its low position. The valve 102 on the range motor piston rod APR is closed, so that the pressure is transmitted solely to the motors A1 and D1, but the latter is not involved at this time. In the motor A1, the exhaust orifice 126 is open, and the exhaust line 160 is connected to the sequence line 188 via the ports 152 and 150 and the groove 154 in the range valve 138, but this has no present effect on the range motor A1 because even though the sequence line 188 is open via the sequence valve means 206 to the exhaust line 182 from the motor B1, the line 182 is blocked from reservoir by the speed valve 140 in its 2—5 position. The pressure differential is thus confined solely to the motor A1 and the piston AP moves to the right, because the pressure is higher at the left hand side of the piston. As the piston AP attains its neutral position, it negatives the orifice 126 and the pressure thus becomes equal at both sides of the piston AP, since, as previously described, the sequence line 188 has no exit at this time. In other words, with the orifice 126 negatived, there is no flow at either side of the neutral piston AP and that piston retains its neutral position.

Now with the interlock valve 102 open as a result of the neutral status of the piston AP, the second pressure line portions 108—110 and 116 are established, creating the condition of Fig. 4, wherein the range piston AP remains in neutral, the piston CP of the motor C1 is in neutral and the piston BP of the motor B1 is conditioned to move to neutral. Looking now at the return of the piston BP to neutral, it will be seen that pressure enters the motor B1 respectively at opposite sides of the actively positioned piston BP. Although both exhaust lines 180 and 182 from the motor B1 are blocked, the orifice 134 is still open to accommodate motor flow from the right side of the piston, whereupon pressure rise occurs at the left hand side of the piston, returning this piston to neutral. At that time, the valve element portion 136 on the piston BP negatives the orifice 134 and the pressure is equal at both sides of the piston, thus retaining the neutral position of that piston. At the same time, pressure in the line portion 110 enters the restricted branches 112 and 114 respectively at opposite sides of the neutrally positioned piston CP, but a pressure differential results from the fact that the 2—5 exhaust line 184 of the motor C1 is connected to reservoir via the speed valve 140. Specifically, the exhaust line 184 registers with the port 178 in the valve 140 and fluid flow thus occurs via 184—168—178—176—174, whereupon the piston CP shifts to the left or to the 2—5 position as shown in Fig. 5.

Just prior to this, with the piston BP in its neutral position and the piston CP short of its 2—5 position, the sequence line 188 is blocked by the piston rod portions of these two pistons. Thus, no change can occur in the range motor A1. However, when the piston CP of the motor C1 attains its active position as shown in Fig. 5, the sequence valve means 198 thereon completes the pre-selected sequence connection of the high-range side of the motor A1 to reservoir. That is, the sequence valve 198 establishes communication between the sequence line portion 194 and the interior of the motor C1 at the left hand side of the piston CP which, as already stated, is connected to reservoir via the exhaust line 184 and speed valve 140, and the range valve 138 in its high position has already pre-selected the connection between the exhaust line 160 and the sequence line 188 via 152—154—150. The resulting pressure drop at the right hand side of the range motor piston AP causes that piston to move from neutral to its high position. The final stage of the shift is shown in Fig. 5. At this time the 1—3, 6—8 clutch B is in neutral, the 2—5, 4—7 clutch C is shifted to the left to make the choice between second and fifth speeds forward, and the selection of the fifth speed forward is achieved by engagement of the range clutch A in its high position, establishing a range ratio in the countershaft via the meshing gears 23 and 28. In other words, the range drive means selects the higher of the two speeds as between second and fifth.

The foregoing is illustrative of a transmission involving the three motors A1, B1 and C1. The fundamentals in all cases are the same. That is, the speed valve involves the selection of connecting the proper exhaust line to reservoir and the range valve involves the selection of connecting the proper range motor exhaust line to the sequence line, and the respective sequence valve completes the sequence line to reservoir.

The same fundamentals are involved in any shift to reverse, with the exception that the reverse motor is shiftable between neutral and one active position as distinguished from the speed and high-low motors which include neutral and two active positions. Therefore, the reverse motor has only the single exhaust line 156 and this is selectively connected to the sequence line 188 via the ports 144 and 146 when the range valve is moved to its maximum upward position so that the groove 154 registers with the letter R in Fig. 2 for example. As in the case of the high-low motor, the speed selection is made first, since the respective sequence valve means in the speed motors complete the sequence line that is pre-selected by the range valve. For example, let it be assumed that first speed in reverse is desired. The selector lever is moved to the 1—3 slot (Fig. 8), setting the speed valve 140 in the 1—3 position. The selector lever 212 is then moved to its maximum rear position in the 1—3 slot, and this shifts the range valve 138 to the reverse position, wherein the groove 154 interconnects the ports 144 and 146, thus connecting the reverse motor exhaust line 156 to the sequence line 188. As before, the sequence valve means 206 completes the sequence line across 202—182 when the piston BP of the speed motor B1 reaches its active or 1—3 position, and the selection of the speed ratio is followed by selection of the range ratio, which is of course a single ratio in the case of the reverse clutch D. Specifically, the drive is now established from the input shaft through the reverse pinion 12 directly to the output gear 48 and this gear is connected to the output shaft because the clutch B is to the left, establishing engagement between the shift ring 60 and the clutuch teeth 48T of the gear 48. The countershaft in this speed merely idles, as do the range pinions 14 and 23, since the clutch A is in neutral. Likewise, the clutch C is in neutral.

The next two reverse speeds are obtained in the same manner except that the speed motor C1 is involved. The second speed in reverse involves the speed motor C1. with the piston CP shifted to the left. Third speed in reverse also involves the speed motor C1, with the piston CP shifted to the right. The fourth speed in reverse, not set up according to the present example, involves shifting of the piston BP of the motor B1 to the right.

From the foregoing description, it will be seen that the arrangement involves sequential operation of the pistons to incur selection of the speed ratio and then selection of the range ratio. This is true in any of the forward or reverse speeds, sequential operation in reverse order is assured by the interlock valve means 102 and 100. As for reverse, the interlock valve means 100 performs just like the previously described interlock valve means 102 on the motor A1, which will be clear without further description. The main control or selector valve means V, when set in its neutral position, retains the neutral positions of the pistons, or at least retains the pistons against shifting except in the sequential order noted. The selector valve means is settable to incur the desired shift and when it is returned to its neutral status, means is provided for assuring the sequence in the reverse order; that is, the range motor piston will return to neutral before the speed motor piston shifts out of its active position. This means involves the respective control orifices 122, 126, 130 or 134, as the case may be, plus the associated interlock means 102 or 100, as the case may be.

Other features of the invention will have occurred from the foregoing description. Still others will evidence themselves to those versed in the art, as will modifications in the preferred embodiment illustrated, all of which may be achieved without departure from the spirit and scope of the invention.

What is claimed is:

1. A fluid-pressure control system for a transmission or the like, comprising: a pressure source and a reservoir; first and second fluid motors, each having a piston shiftable between neutral and active positions; first and second pressure lines leading from the source, each having a pair of restricted branches connected to a motor respectively at opposite sides of said motor piston; first and second neutralizing valve means respectively for said motors, each including a motor-to-reservoir orifice and a valve element for negativing said orifice when the associated piston is in neutral and for effectuating said orifice to accommodate motor-to-reservoir flow when said piston is out of neutral; interlock valve means operative to establish and disestablish the second pressure line respectively according to the neutral and active positions of the first motor piston; first and second exhaust lines leading respectively from the active-position sides of the motors respectively downstream of the restricted branches; a sequence line including sequence valve means operative to disestablish and establish said sequence line to reservoir respectively according to the neutral and active positions of the second motor piston; and selector valve means neutrally positioned to block the exhaust lines from reservoir so that pressurizing of both sides of both motors fixes the positions of the pistons, said selector valve means being operative to connect the first and second exhaust lines respectively to the sequence line and reservoir to incur a pressure drop at the active-position side of the second motor piston so that said piston achieves its active position and operates the sequence valve means to establish the sequence line to reservoir and thus to incur a pressure drop at the active-position side of the first motor piston whereby that piston moves to its active position and operates the interlock valve means to disestablish the second pressure line, said pistons in their active positions incurring operation of the respective neutralizing valve means to accommodate motor-to-reservoir flow when the selector valve means is again neutrally positioned to incur return of the first motor piston to neutral ahead of the second motor piston.

2. The invention defined in claim 1, in which: each neutralizing valve means orifice is in the respective motor in register with the neutral position of the piston of that motor, and the associated valve element is on said piston.

3. The invention defined in claim 1, in which: the sequence valve means is on the second motor piston and establishes the sequence line to reservoir by connection of said line to the active-position side of the second motor whereby said line leads to the reservoir via the second motor exhaust line when the second motor piston is in its active position.

4. The invention defined in claim 1, in which: the interlock valve means includes a housing portion on the first motor and a piston rod on the first motor piston and extending into said housing portion, said portion and said piston rod having cooperative valve parts for blocking and permitting flow through the second pressure line.

5. A fluid-pressure control system for a transmission or the like comprising: a pressure source and a reservoir; first and second fluid motors, each having a piston shiftable to active positions at either side of a neutral position; first and second pressure lines leading from the source, each having a pair of restricted branches connected to a motor respectively at opposite sides of said motor piston; first and second neutralizing valve means respectively for said motors, each including a motor-to-reservoir orifice and a valve element for negativing said orifice when the associated piston is in neutral and for effectuating said orifice to accommodate motor-to-reservoir flow when said piston is out of neutral; interlock valve means operative to establish and disestablish the second pressure line respectively according to the neutral and active positions of the first motor piston; a first pair of exhaust lines leading from the first motor respectively at opposite sides of the first motor piston and respectively downstream of the first pressure line restricted branches; a second pair of exhaust lines leading from the second motor respectively at opposite sides of the second motor piston and respectively downstream of the second pressure line restricted branches; a sequence line including sequence valve means operative to disestablish and establish said sequence line to reservoir respectively according to the neutral and active positions of the second motor piston; and selector valve means neutrally positioned to block the exhaust lines from reservoir so that pressurizing of both sides of both motors fixes the positions of the pistons, said selector valve means being operative to connect either exhaust line of the first pair to the sequence line and either exhaust line of the second pair to the reservoir to incur a pressure drop at the exhausted side of the second motor piston whereby said piston moves to an active position and operates the sequence valve means to establish the sequence line to reservoir and thus to incur a pressure drop at the sequence-line-exhausted side of the first motor piston whereby that piston moves to an active position and operates the interlock valve means to disestablish the second pressure line, said pistons in their active positions incurring operation of the respective neutralizing valve means to accommodate motor-to-reservoir flow when the selector valve means is again neutrally positioned to incur return of the first motor piston to neutral ahead of the second motor piston.

6. A fluid pressure control system for a transmission or the like comprising: a pressure source and a reservoir; first, second and third fluid motors, each having a piston shiftable between neutral and active positions; a first motor pressure line leading from the source and having a pair of restricted branches connected to the first motor respectively at opposite sides of the first motor piston; a second pressure line leading from the source and having one pair of restricted branches connected to the second motor respectively at opposite sides of the second motor piston and another pair of restricted branches connected to the third motor respectively at opposite sides of the third motor piston; first, second and third neutralizing valve means respectively for said motors, each including a motor-to-reservoir orifice and a valve element for negativing said orifice when the associated piston is in neutral and for effectuating said orifice to accommodate motor-to-reservoir flow when said piston is out of neutral; interlock valve means operative to establish and disestablish the second pressure line upstream of both pairs of restricted branches in said second pressure line respectively according to the neutral and active positions of the first motor piston; first, second and third exhaust lines leading respectively from the active-position sides of the motors respectively downstream of the restricted branches; a sequence line including sequence valve means operative to disestablish and establish said sequence line to reservoir respectively according to the neutral and active positions of either of the second and third motor pistons; and selector valve means neutrally positioned to block the exhaust lines from reservoir so that pressurizing of both sides of all motors fixes the positions of the pistons, said selector valve means being operative to connect the first exhaust line to the sequence line and to selectively connect either of the second and third exhaust lines individually to the reservoir to incur a pressure drop at the active-position side of a selected one of the second and third motors so that the piston of said selected motor achieves its active position and operates the sequence valve means to establish the sequence line to reservoir and thus to incur a pressure drop at the active-position side of the first motor piston whereby that piston moves to its active position and operates the interlock valve means to disestablish the second pressure line, said pistons in their active positions incurring operations of the respective neutralizing valve means to accommodate motor-to-reservoir flow when the selector valve means is again neutrally positioned to incur return of the first motor piston to neutral ahead of the second motor piston.

7. A fluid-pressure control system for a transmission or the like, comprising; a pair of fluid motors, each having a piston shiftable between neutral and active positions; a pressure source connected to and for pressuring both sides of both motors simultaneously; control means neutrally positioned to incur balancing pressures at opposite sides of both pistons to hold the neutral positions of said pistons, said control means being actively settable to incur a pressure differential in one motor and to preselect but to postpone the occurrence of a pressure differential in the other motor whereby the piston of said one motor moves to its active position while the other piston retains its neutral position; means operative in response to the attainment by said one piston of its active position to effectuate the occurrence of said postponed pressure differential in said other motor so that the piston of said other motor moves to its active position; and means for reversing the pressure differential conditions in said other motor so that the piston of said other motor returns to its neutral position when the control means is again neutrally positioned.

8. The invention defined in claim 7, including: interlock means operative in response to the attainment by said other motor piston of its active position to disconnect said one motor from the pressure source until said other motor piston returns to neutral upon neutral positioning of the control means, whereby said other motor piston returns to its neutral position while the piston of said one motor is in its active position.

9. In a dual-range, multi-speed transmission having a range section including range-change means selectively settable at opposite sides of neutral to produce high and low range ratios, and a speed section including speed change means selectively settable at opposite sides of neutral to produce high and low speed ratios: a fluid pressure control system comprising a range motor having a piston shiftable to either side of a neutral position and connected to the range-change means for incurring neutral and high and low range ratios therein; a speed motor having a piston shiftable to opposite sides of a neutral position and connected to the speed-change means for incurring neutral and high and low speed ratios therein; a pressure source for pressurizing both sides of both motors simultaneously with the pistons in their neutral positions; control valve means neutrally positioned to incur pressure balance at opposite sides of both pistons so as to retain said neutral positions, and said control valve means being selectively operative to incur a pressure drop at either side of the speed motor piston and to preselect but to postpone a pressure drop at either side of the range motor so as to cause a pressure shift of the speed motor piston from neutral to incur a selected speed-ratio while the range motor piston retains its neutral position; means operative in response to shifting of said speed motor piston in the selected direction and in an amount incurring the selected speed ratio for effectuating the postponed pressure drop at the preselected side of the range motor piston whereby that piston shifts to incur the selected range ratio; and means for incurring a pressure drop exclusively at the opposite side of the range motor to enable pressurized return of the range motor piston to neutral when the control valve means is again neutrally positioned.

10. In a dual-range, multi-speed reversing transmission having a range section including range-change means selectively settable at opposite sides of neutral to produce high and low range ratios, and reverse means selectively settable in neutral and reverse drive, and a speed section including speed change means selectively settable at opposite sides of neutral to produce high and low speed ratios: a fluid pressure control system comprising a range motor having a piston shiftable to either side of a neutral position and connected to the range-change means for incurring neutral and high and low range ratios therein; a speed motor having a piston shiftable to opposite sides of a neutral position and connected to the speed change means for incurring neutral and high and low speed ratios therein; a reverse motor having a piston shiftable to an active position at one side of a neutral position and connected to the reverse means to incur neutral and reverse drive therein; a pressure source for pressurizing both sides of all motors simultaneously with the pistons in their neutral positions; control valve means neutrally positioned to incur pressure balance at opposite sides of all pistons so as to retain said neutral positions, and said control valve means being selectively operative in a forward phase to incur a pressure drop at either side of the speed motor piston and to preselect but to postpone a pressure drop at either side of the range motor, while retaining the pressure balance in the reverse motor, so as to cause a pressure shift of the speed motor piston from neutral to incur a selected speed-ratio while the range motor piston retains its neutral position, said control valve means being further operative in a reverse phase to incur a pressure drop at either side of the speed motor piston and to preselect but to postpone a pressure drop at the active position side of the reverse motor, while retaining the pressure balance in the range motor; means operative in response to shifting of said speed motor piston in the selected direction and in an amount incurring the selected speed ratio for effectuating the postponed pressure drop at the preselected side of either the range motor or the reverse motor, as the case may be, whereby the selected range or reverse motor piston incurs the selected range ratio or reverse drive; and means for incurring a pressure drop exclusively at the opposite side of the range or reverse motor to enable pressurized return of the range or reverse motor piston to neutral when the control valve means is again neutrally positioned.

11. In a multi-speed, reversing transmission having a speed section including speed change means selectively settable at opposite sides of neutral to produce high and low speed ratios and a reverse section including reversing means selectively settable in neutral and reverse drive: a fluid pressure control system comprising a reverse motor having a piston shiftable between neutral and active positions and connected to the reversing means for incurring neutral and reverse drive; a speed motor having a piston shiftable to opposite sides of a neutral position and connected to the speed-change means for incurring neutral and high and low speed ratios therein; a pressure source for pressurizing both sides of both motors simultaneously with the pistons in their neutral positions; control valve means neutrally positioned to incur pressure balance at opposite sides of both pistons so as to retain said neutral positions, and said control valve means being selectively operative to incur a pressure drop at either side of the speed motor piston and to preselect but to postpone a pressure drop at the active-position side of the reverse motor so as to cause a pressure shift of the speed motor piston from neutral to incur a selected speed-ratio while the reverse motor piston retains its neutral position; means operative in response to shifting of said speed motor piston in the selected direction and in an amount incurring the selected speed ratio for effectuating the postponed pressure drop at the preselected side of the reverse motor piston whereby that piston shifts to incur reverse drive; and means for incurring a pressure drop exclusively at the opposite side of the reverse motor to enable pressurized return of the range motor piston to neutral when the control valve means is again neutrally positioned.

12. In a dual-range, multi-speed, reversible transmission having a speed section provided with speed-change means selectively operative to produce neutral and different speed ratios, and a range section provided with forward drive means selectively operative to produce neutral and high and low ratios and reverse drive means selectively operative to produce neutral and reverse: a fluid pressure control system comprising a speed motor having a piston connected to the speed section and shiftable to active positions at either side of neutral to selectively incur neutral and said speed ratios; a pair of range-section motors, including a high-low motor having a piston connected to the forward drive means and shiftable to active positions at opposite sides of neutral to selectively incur neutral and said high and low ratios, and a reverse motor having a piston connected to the reverse drive means and shiftable between neutral and active positions to incur neutral and reverse; a pressure source for pressurizing both sides of all motors simultaneously; control valve means neutrally settable with all pistons in neutral to incur pressure balance at both sides of all motors so as to retain the pistons in neutral, and said control valve means being selectively settable in a forward phase to incur a pressure drop at either side of the speed motor and to preselect but to postpone a pressure drop at either side of the high-low motor and settable in a reverse phase to incur a pressure drop at either side of the speed motor and to preselect but to postpone a pressure drop at the active-position side of the reverse motor, whereby in either case the speed motor operates first to incur a speed change while the preselected range section motor retains its neutral position; means operative automatically when the speed motor piston attains its selected active position to effectuate the preselected pressure drop in the selected range-section motor for sequentially incurring a range-section motor piston shift to change the range section of the transmission according to the phase of the control valve means; and means for incurring a pressure drop exclusively at the opposite side of the selected range-section motor to enable pressurized return of the range section motor piston to neutral when the control valve means is again neutrally set.

References Cited in the file of this patent

UNITED STATES PATENTS

| | | |
|---|---|---|
| 2,157,592 | Casler | May 9, 1939 |
| 2,177,904 | Maybach | Oct. 31, 1939 |
| 2,546,865 | Niband | Mar. 27, 1951 |